US012808227B2

(12) United States Patent
Shinoto et al.

(10) Patent No.: US 12,808,227 B2
(45) Date of Patent: Nov. 24, 2026

(54) LOCKING MECHANISM AND IMAGE FORMING APPARATUS

(71) Applicant: FUJIFILM Business Innovation Corp., Tokyo (JP)

(72) Inventors: Keigo Shinoto, Kanagawa (JP); Shuichi Nishide, Kanagawa (JP); Michiaki Yoshida, Kanagawa (JP); Akira Ueshima, Kanagawa (JP); Akira Tanaka, Kanagawa (JP); Takahiro Iizuka, Kanagawa (JP); Wataru Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/302,801

(22) Filed: Apr. 19, 2023

(65) Prior Publication Data

US 2024/0133208 A1 Apr. 25, 2024
US 2024/0229505 A9 Jul. 11, 2024

(30) Foreign Application Priority Data

Oct. 25, 2022 (JP) ................................ 2022-170645

(51) Int. Cl.
*E05B 15/10* (2006.01)
*B65H 1/04* (2006.01)

(52) U.S. Cl.
CPC ............... *E05B 15/10* (2013.01); *B65H 1/04* (2013.01); *B65H 2402/45* (2013.01); *B65H 2801/06* (2013.01)

(58) Field of Classification Search
CPC ....... E05B 15/10; B65H 1/04; B65H 2402/45; B65H 2801/06
See application file for complete search history.

(56) References Cited

U.S. PATENT DOCUMENTS 7,210,711 B2 * 5/2007 Dirnberger ................ E05C 3/24 292/68
9,791,822 B2 * 10/2017 Abe ................... G03G 21/1633
(Continued)

FOREIGN PATENT DOCUMENTS

| | | |
|---|---|---|
| JP | 2002371733 | 12/2002 |
| JP | 2016194674 | 11/2016 |
| JP | 2017156520 | 9/2017 |

OTHER PUBLICATIONS

"Notice of Reasons for Refusal of Japan Counterpart Application", issued on Sep. 1, 2026, with English translation thereof, p. 1-p. 5.

*Primary Examiner* — Mark A Williams
(74) *Attorney, Agent, or Firm* — JCIPRNET

(57) ABSTRACT

A locking mechanism includes a first member that is provided on one side to lock and is rotated about a rotating shaft, a second member that is provided on the other side to lock and comes into contact with the first member to rotate the first member, a rotation applying member that further applies a rotational force to the first member rotated by the second member, a restriction portion that restricts movement of the first member to be rotated in a direction in which the first member is released from a locked state, and an elastic portion that allows the first member and the restriction portion to be in elastic contact with each other and allows the first member and the restriction portion to start to be in elastic contact with each other before the first member rotated by the second member is further rotated by the rotation applying member in a release direction which is the direction in which the first member is released from the locked state.

18 Claims, 9 Drawing Sheets

(56) References Cited

U.S. PATENT DOCUMENTS

| | | | | |
|---|---|---|---|---|
| 9,869,965 | B2 | 1/2018 | Inada | |
| 10,858,859 | B2 * | 12/2020 | Li | E05B 15/029 |
| 11,819,177 | B2 * | 11/2023 | Chirumbolo | E05C 19/024 |
| 2003/0218339 | A1 * | 11/2003 | Bassi | E05C 19/024 292/138 |
| 2010/0052338 | A1 * | 3/2010 | Osvatic | E05B 17/0025 292/216 |
| 2012/0119522 | A1 * | 5/2012 | Bauriedl | E05C 19/024 292/228 |
| 2012/0126552 | A1 * | 5/2012 | Ala | E05C 19/024 292/228 |
| 2013/0234578 | A1 * | 9/2013 | Ala | E05C 3/12 292/220 |
| 2015/0021927 | A1 * | 1/2015 | Wang | A47L 15/4259 292/99 |
| 2015/0267446 | A1 * | 9/2015 | Promutico, I | E05C 19/02 292/122 |
| 2017/0211221 | A1 * | 7/2017 | Uros | D06F 39/14 |
| 2017/0315503 | A1 * | 11/2017 | Maeda | G03G 21/1647 |

* cited by examiner

LOCKING MECHANISM AND IMAGE FORMING APPARATUS

CROSS-REFERENCE TO RELATED APPLICATIONS

This application is based on and claims priority under 35 USC 119 from Japanese Patent Application No. 2022-170645 filed Oct. 25, 2022.

BACKGROUND

(i) Technical Field

The present invention relates to a locking mechanism and an image forming apparatus.

(ii) Related Art

JP2017-156520A discloses a technique for pinching a member, which is accelerated by a spring, between elastically deformable members, decelerating the member, and suppressing collision noise to provide a locking mechanism capable of suppressing the generation of impact noise.

JP2016-194674A discloses that a member to be accelerated due to the switching of rotation moment is pinched to suppress collision noise before a time when rotation moment generated by a spring is switched, to provide a locking mechanism including a toggle mechanism capable of addressing the problem of abnormal noise generated before and after a neutral point.

SUMMARY

For example, a rotation applying member, which locks a cover using a rotating member and applies rotation to the rotating member, may be used in various locking mechanisms used to lock the cover to a housing. However, in a case where the rotating member, which is accelerated to rotate by the rotation applying member, collides with another member, loud noise is generated. In a case where the positions of a plurality of members are to be adjusted to suppress this noise to be generated, it is necessary to consider a cumulative tolerance caused by the disposition of the plurality of members. For this reason, the burden of design is high.

Aspects of non-limiting embodiments of the present disclosure relate to a locking mechanism and an image forming apparatus of which the burden of design is reduced as compared to a case where the positions of a plurality of members are adjusted to suppress noise to be generated from a locking mechanism.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a locking mechanism including a first member that is provided on one side to lock and is rotated about a rotating shaft, a second member that is provided on the other side to lock and comes into contact with the first member to rotate the first member, a rotation applying member that further applies a rotational force to the first member rotated by the second member, a restriction portion that restricts movement of the first member to be rotated in a direction in which the first member is released from a locked state, and an elastic portion that allows the first member and the restriction portion to be in elastic contact with each other and allows the first member and the restriction portion to start to be in elastic contact with each other before the first member rotated by the second member is further rotated by the rotation applying member in a release direction which is the direction in which the first member is released from the locked state.

BRIEF DESCRIPTION OF THE DRAWINGS

Exemplary embodiment(s) of the present invention will be described in detail based on the following figures, wherein:

FIG. 2A is a perspective view of the locking unit as viewed from a front side in FIG. 1, and FIG. 2B is a perspective view of the locking unit as viewed from a rear side;

FIG. 3A is a perspective view of the pulling member, and FIG. 3B is a perspective view showing a part of the pulling member in a cross section to illustrate the inside of the pulling member;

FIG. 4A is a perspective view of the holding member as viewed from a front side in FIG. 4A, and FIG. 4B is a perspective view of the holding member as viewed from a rear side;

DETAILED DESCRIPTION

An exemplary embodiment of the present invention will be described in detail below with reference to the accompanying drawings.

Figure 1:
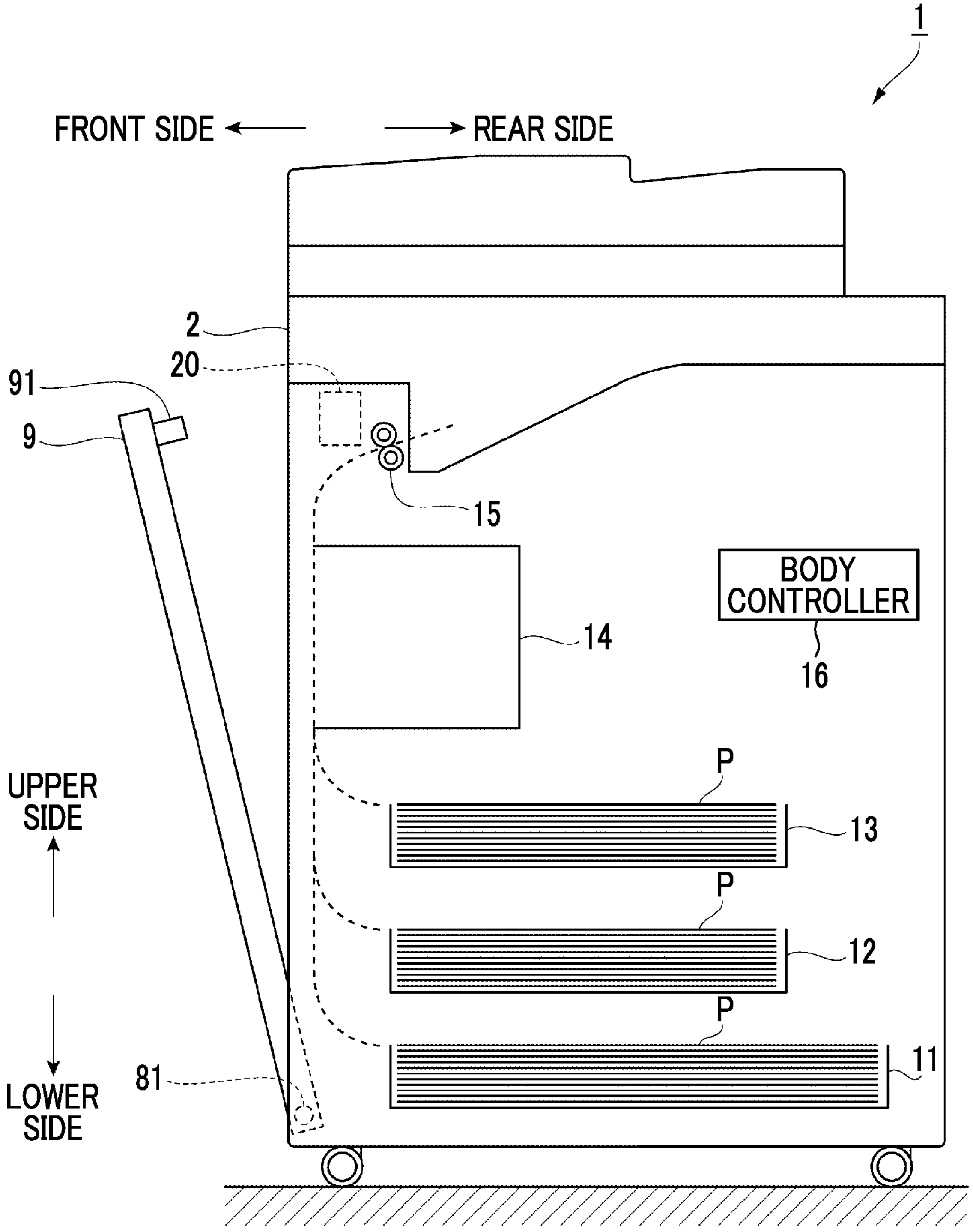
FIG. 1 is a diagram showing the configuration of an image forming apparatus to which a present exemplary embodiment is applied.

FIG. 1 is a diagram showing the configuration of an image forming apparatus 1 to which the present exemplary embodiment is applied.

The image forming apparatus 1 forms an image on a recording medium, such as a sheet P, using an electrophotographic method or the like.

The image forming apparatus 1 includes a housing 2 that is an exterior covering an outer surface of the image forming apparatus 1, and a cover 9 that can be opened and closed on the housing 2. The housing 2 and the cover 9 are connected to each other via a cover rotating shaft 81 by which the housing 2 and the cover 9 are rotatably connected to each other.

For example, in a case where work inside the apparatus is to be performed, such as a case where a sheet P causes a paper jam on a transport path in the image forming apparatus 1 and a user opens and closes the cover 9 to deal with this paper jam, the cover 9 is opened and closed.

The housing 2 includes a locking unit 20 that is used to close the cover 9, and the cover 9 includes a pushing member 91 that is to be pulled in by the locking unit 20. The pushing member 91 is provided at a position facing the locking unit 20 in a case where the cover 9 is closed.

The locking unit 20 and the pushing member 91 are an example of a locking mechanism.

Various devices for forming an image on a sheet P are provided in the housing 2. The image forming apparatus 1 includes sheet storage units 11, 12, and 13 that store sheets P, an image forming unit 14 that forms an image on the sheet P, discharge rollers 15 that discharge the sheet P on which the image is formed, and a body controller 16 that controls the operation of the image forming apparatus 1.

The image forming unit 14 forms an image on the sheet P that is transported from each of the sheet storage units 11, 12, and 13. For example, an electrophotographic method of transferring toner adhered to a photoreceptor to a sheet P to form an image, an ink jet method of jetting ink onto a sheet P to form an image, and the like are employed for the image forming unit 14.

Next, the locking unit 20 will be described with reference to FIGS. 2A and 2B.

Figure 2A:
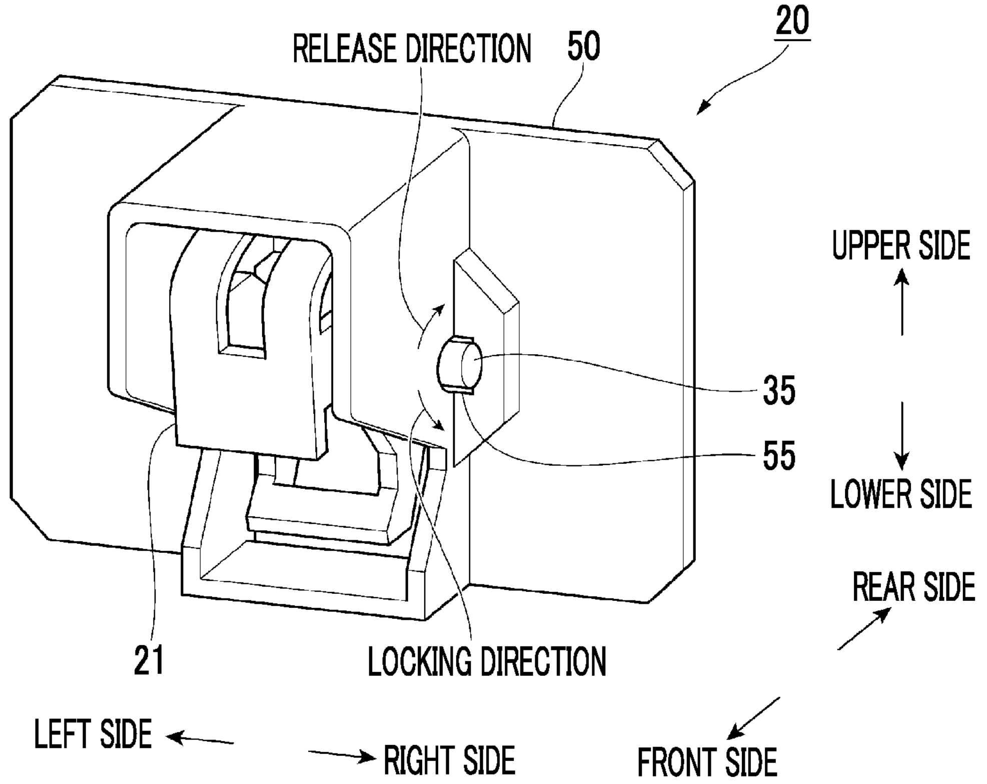
FIGS. 2A and 2B are diagrams illustrating a locking unit.
Figure 2B:
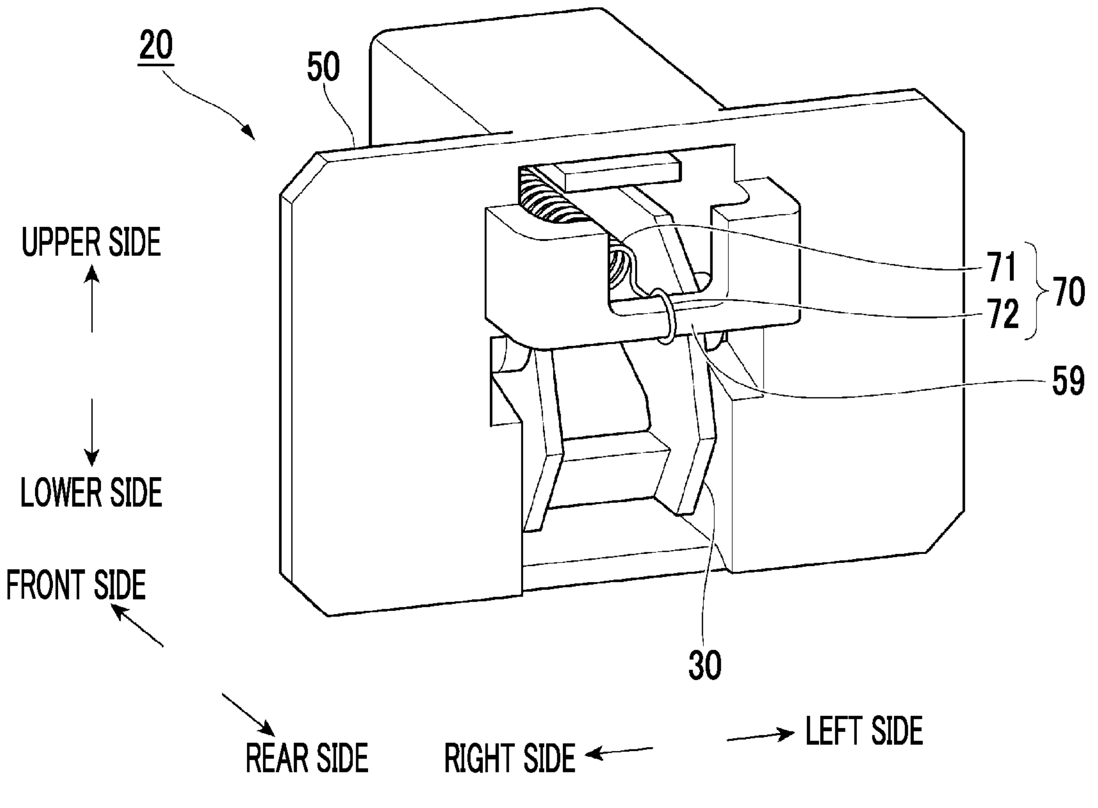

FIGS. 2A and 2B are diagrams illustrating the locking unit 20. FIG. 2A is a perspective view of the locking unit 20 as viewed from a front side in FIG. 1, and FIG. 2B is a perspective view of the locking unit 20 as viewed from a rear side.

The locking unit 20 includes a pulling member 21, a holding member 50, and a rotation applying member 70.

The pulling member 21 includes rotating shafts 35, and is rotated about the rotating shafts 35.

The holding member 50 holds the pulling member 21. The holding member 50 includes rotating shaft holding portions 55 that are openings by which the rotating shafts 35 of the pulling member 21 are rotatably held.

The rotation applying member 70 is a tension coil spring 71 in the present exemplary embodiment, and includes hooks 72 at both ends of the tension coil spring 71 in a longitudinal direction.

As shown in FIG. 2A, the rotating shafts 35 of the pulling member 21 are rotatably inserted into the rotating shaft holding portions 55 of the holding member 50. Here, in a case where the rotating shaft 35 is viewed from a right side toward a left side, a clockwise direction about the rotating shaft 35 is referred to as a release direction and a counter-clockwise direction about the rotating shaft 35 is referred to as a locking direction as shown in FIG. 2A.

Further, as shown in FIG. 2B, one of the two hooks 72 provided at the tension coil spring 71 is mounted on a hook hooking portion 59 provided on the holding member 50. Furthermore, the other of the hooks 72 of the tension coil spring 71 is mounted on a hook hooking portion 38 (described later) of the pulling member 21. The tension coil spring 71 applies a force to the hook hooking portion 38 of the pulling member 21 in a direction in which the tension coil spring 71 is contracted. A force applied to the pulling member 21 by the tension coil spring 71 causes the pulling member 21 to rotate in the release direction or the locking direction about the rotating shafts 35. Although described later with reference to FIGS. 5A, 5B, and 5C, a direction in which the tension coil spring 71 rotates the pulling member 21 is determined depending on a relationship between the positions of both the ends of the tension coil spring 71 and the positions of the rotating shafts 35.

Next, the pulling member 21 will be described with reference to FIGS. 3A and 3B.

Figure 3A:
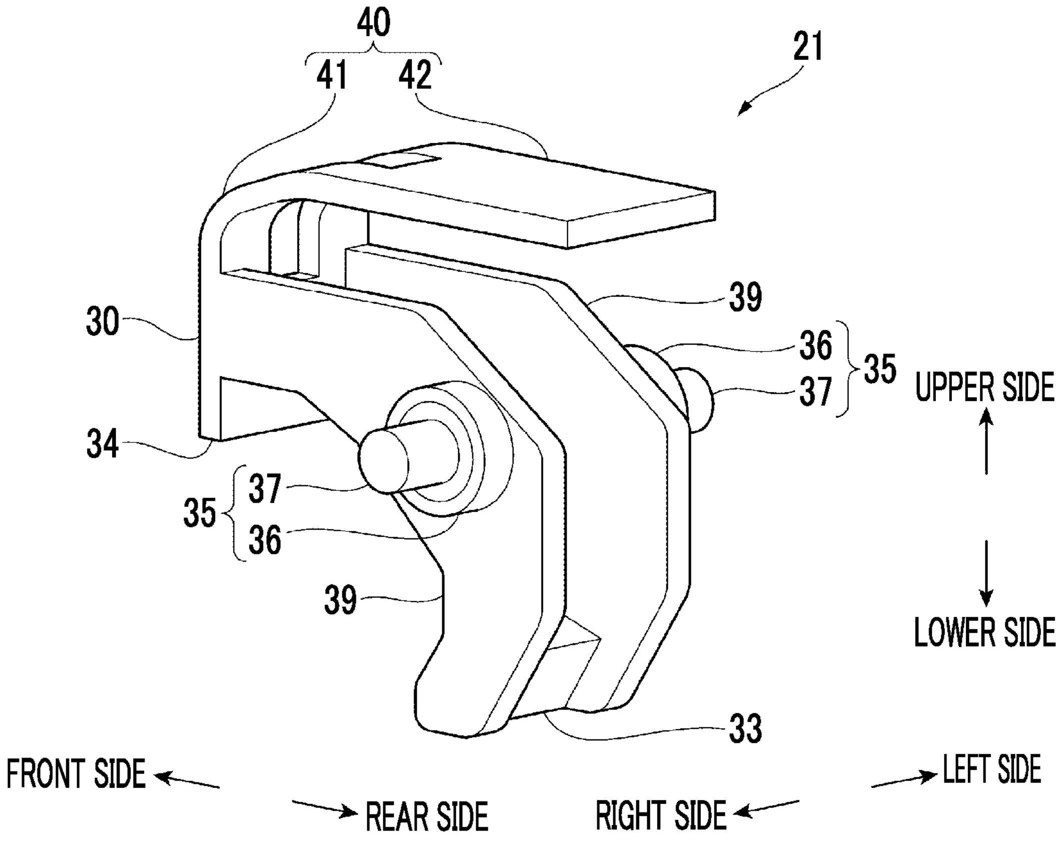
FIGS. 3A and 3B are perspective views illustrating a pulling member.
Figure 3B:
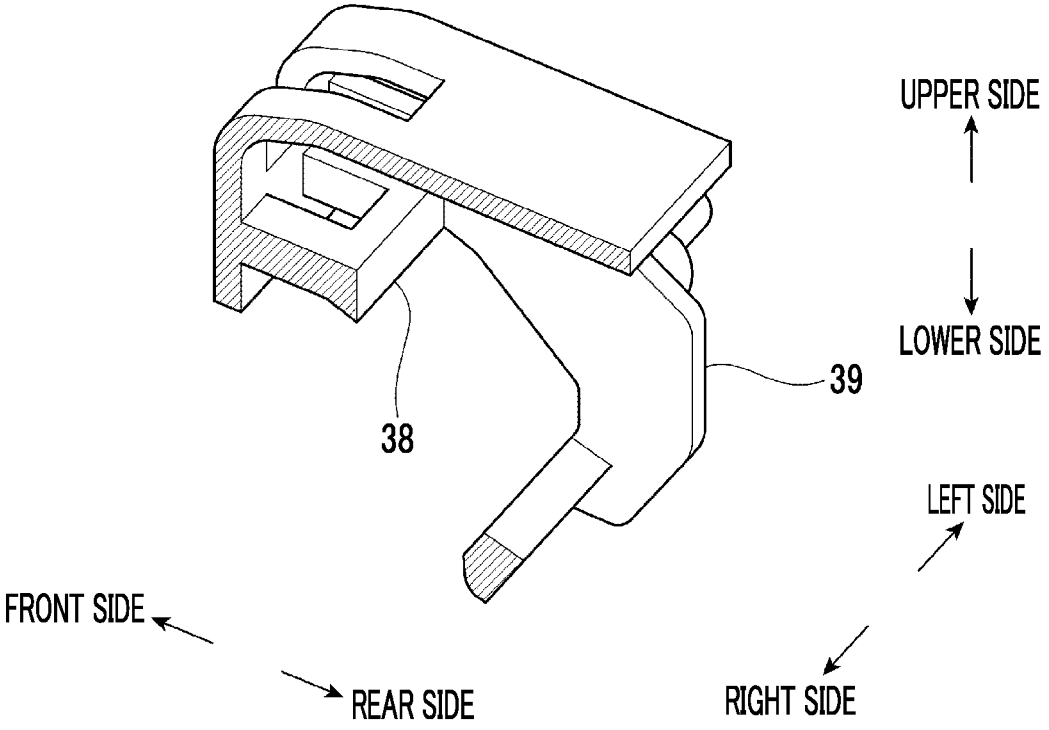

FIGS. 3A and 3B are perspective views illustrating the pulling member 21. FIG. 3A is a perspective view of the pulling member 21, and FIG. 3B is a perspective view showing a part of the pulling member 21 in a cross section to illustrate the inside of the pulling member 21.

The pulling member 21 includes a rotating member 30 and an elastic member 40.

The rotating member 30 includes a receiving portion 33, a pulling portion 34, the rotating shafts 35, a hook hooking portion 38, and a lever 39. The rotating member 30 is an example of a first member.

As shown in FIGS. 3A and 3B, in the present exemplary embodiment, the lever 39 includes two arc-shaped lever portions facing each other and the receiving portion 33 and the hook hooking portion 38 are positioned between the two lever portions. As shown in FIGS. 3A and 3B, the receiving portion 33 is provided on one end side of the lever 39 and the hook hooking portion 38 is provided on the other end side of the lever 39. The pulling portion 34 is provided over the two lever portions of the lever 39 and is positioned close to the hook hooking portion 38. The pulling portion 34 extends downward from the lever portions.

The receiving portion 33 comes into contact with the pushing member 91 (see FIG. 1) provided on the cover 9 in a case where the cover 9 is closed. The pushing member 91 comes into contact with the receiving portion 33, so that the rotating member 30 is rotated. The pushing member 91 is an example of a second member.

The pulling portion 34 is a member that comes into contact with the pushing member 91 and pulls the pushing member 91 to the housing 2 (see FIG. 1) in a case where the cover 9 is closed. Here, a state where the cover 9 is closed and the pulling portion 34 pulls the pushing member 91 to the housing 2 is referred to as a locked state.

The hook hooking portion 38 is a member to which the hook 72 of the tension coil spring 71 is to be hooked.

Each of the rotating shafts 35 has a stepped shape in which a rotating shaft-base portion 36 and a rotating shaft-end portion 37 having outer diameters different from each other are integrally formed, and each of the two lever portions of the lever 39 is provided with the rotating shaft 35. More specifically, in a case where the surfaces of the two lever portions facing each other are defined as inner surfaces, the rotating shafts 35 are provided on outer surfaces that are surfaces opposite to the inner surfaces, respectively. The two rotating shafts 35 are positioned on an identical axis.

More specifically, the rotating shaft-base portion 36 is positioned between the lever portion and the rotating shaft-end portion 37.

The rotating shafts 35 are held by the rotating shaft holding portions 55 of the holding member 50. More specifically, the outer diameter of the rotating shaft-base portion 36 is larger than the size of the opening of the rotating shaft holding portion 55, and the outer diameter of the rotating shaft-end portion 37 is smaller than the size of the opening of the rotating shaft holding portion 55.

In a case where the rotating member 30 is mounted on the holding member 50, the movement of the rotating shaft-base portions 36 to the left side and the right side of the rotating member 30 is restricted by the holding member 50.

The elastic member 40 includes a rising portion 41 and a plate portion 42.

As shown in FIG. 3A, the rising portion 41 is a member that is formed to rise from a front upper portion of the rotating member 30. The plate portion 42 is a plate-like elastic member that is provided to be connected to the rising portion 41 and extends rearward from the rising portion 41. In a case where the plate portion 42 receives a downward force on an upper surface of the plate portion 42, the plate portion 42 itself is deformed to be bent downward. The elastic member 40 is an example of an elastic portion.

Figure 4A:
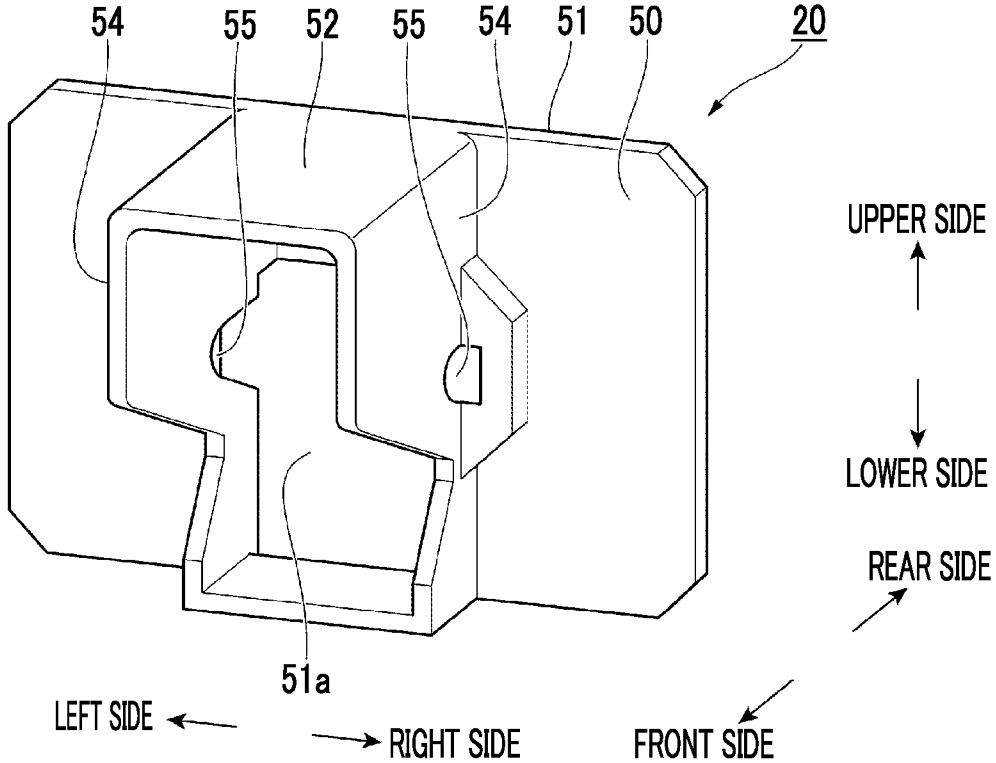
FIGS. 4A and 4B are perspective views illustrating a holding member.
Figure 4B:
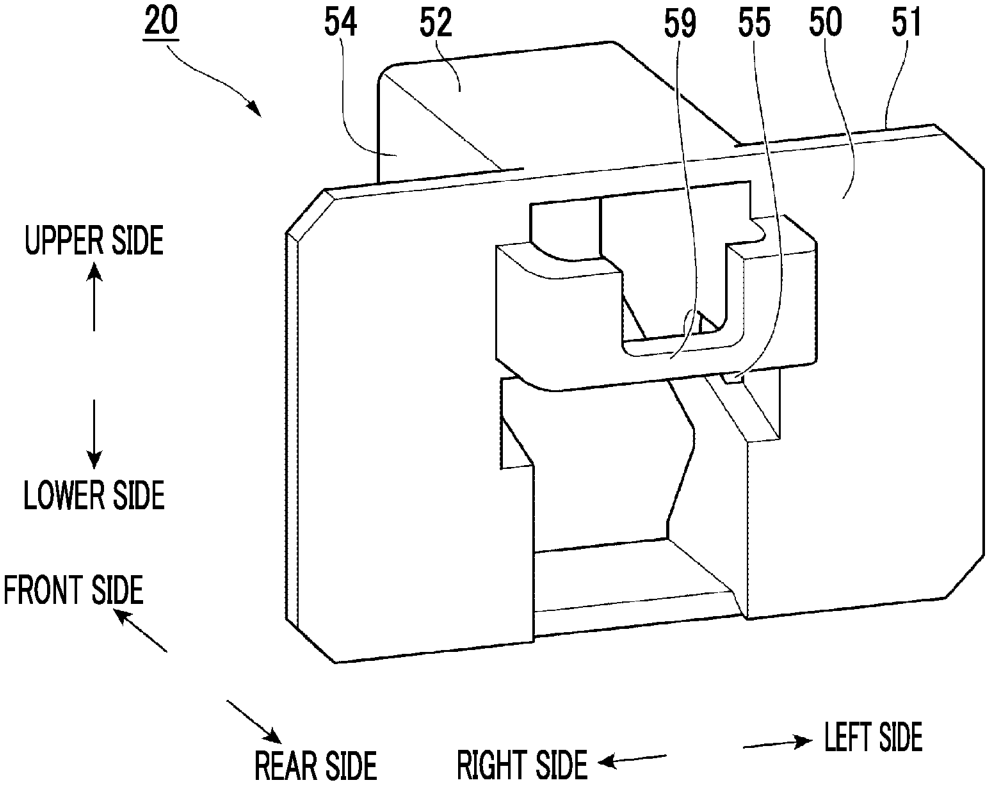

FIGS. 4A and 4B are perspective views illustrating the holding member 50. FIG. 4A is a perspective view of the holding member 50 as viewed from a front side in FIG. 4A, and FIG. 4B is a perspective view of the holding member 50 as viewed from a rear side.

The holding member 50 includes a holding substrate 51.

The holding substrate 51 is a plate-like member, and includes an opening 51*a* that is provided near a center of the holding substrate 51 and is used to mount the pulling member 21. The holding substrate 51 is a portion serving as a base portion of the holding member 50, and includes a restriction portion 52, side surfaces 54, rotating shaft holding portions 55, a hook hooking portion 59.

As shown in FIG. 4A, the restriction portion 52 is positioned on the upper side of the holding substrate 51 and extends forward from the holding substrate 51. The restriction portion 52 includes an inner surface positioned on a side corresponding to the rotating shaft holding portions 55. In a case where the pulling member 21 is rotated in the release direction (see FIGS. 2A and 2B) in a state where the pulling member 21 is mounted on the holding member 50, the elastic member 40 of the pulling member 21 comes into contact with the inner surface of the restriction portion 52 and restricts the movement of the pulling member 21.

As shown in FIG. 4A, the side surfaces 54 are portions extending downward from the restriction portion 52 and protect the pulling member 21 mounted on the holding member 50.

The rotating shaft holding portions 55 are openings that are provided in the side surfaces 54, and hold the rotating shafts 35 of the pulling member 21.

The hook hooking portion 59 protrudes rearward from the holding substrate 51 (see FIGS. 5A, 5B, and 5C), and holds the hook 72 of the tension coil spring 71 on the rear side of the holding substrate 51. As shown in FIG. 4B, the hook hooking portion 59 is positioned to be separated from the restriction portion 52 to the lower side. The hook hooking portion 59 is connected across the opening 51*a* of the holding substrate 51.

In the present exemplary embodiment, the holding member 50 is a single component and the holding member 50 is adapted to be mounted on the housing 2. However, the holding member 50 may be provided on another member of the housing 2.

Action

Figures 5A, 5B, 5C:
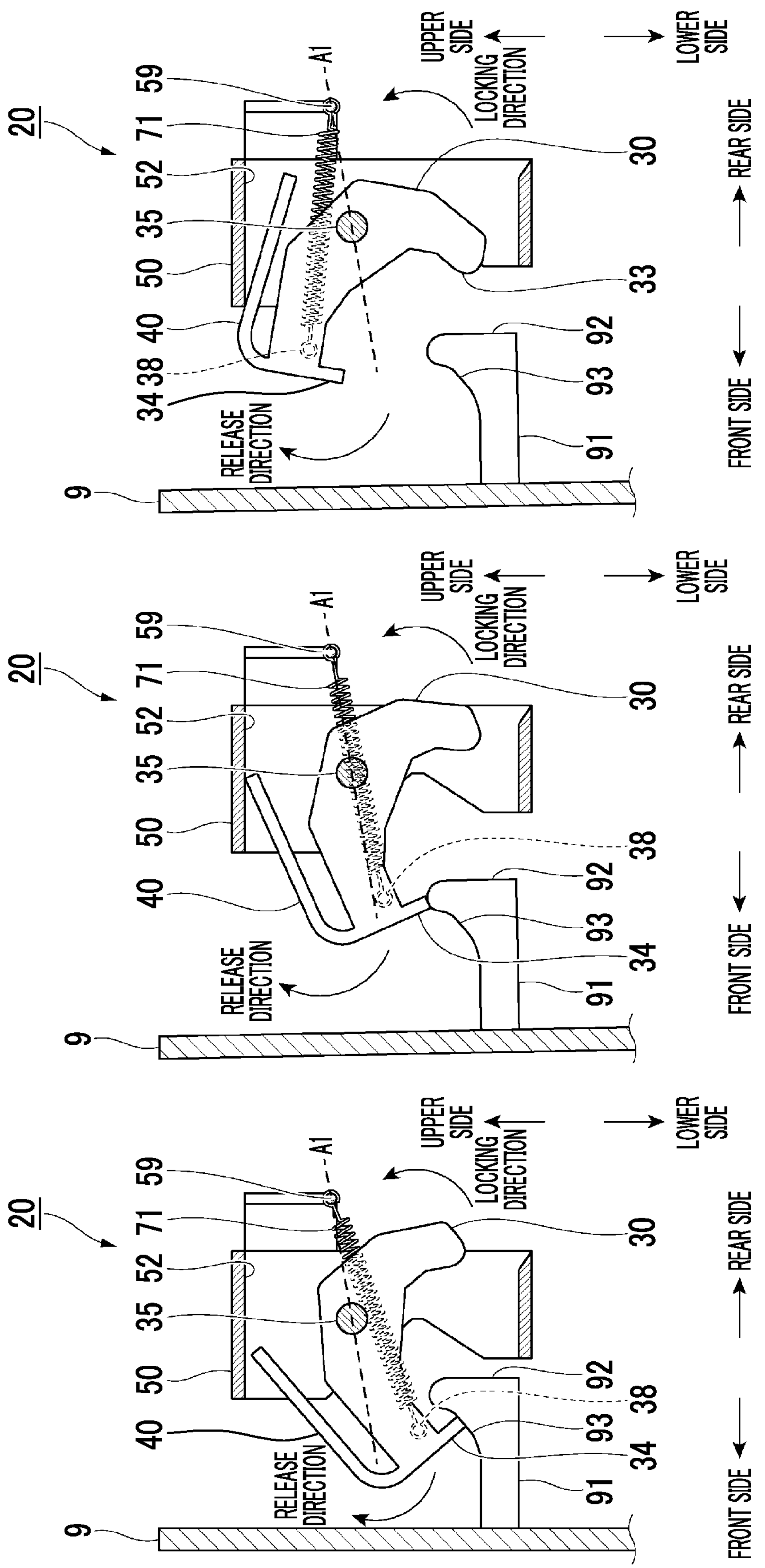
FIGS. 5A, 5B, and 5C are diagrams illustrating a relationship between the locking unit and a pushing member in a case where a cover is opened, and are shown in chronological order.

FIGS. 5A, 5B, and 5C are diagrams illustrating a relationship between the locking unit 20 and the pushing member 91 in a case where the cover 9 is opened, and are shown in chronological order. FIG. 5A is a diagram showing a state where the pulling portion 34 is in contact with a portion 93 to be pulled and the elastic member 40 is not in contact with the restriction portion 52, FIG. 5B is a diagram showing a state where the pulling portion 34 is in contact with the portion 93 to be pulled and the elastic member 40 is in contact with the restriction portion 52, and FIG. 5C is a diagram showing a state where the pulling portion 34 is separated from the portion 93 to be pulled and the elastic member 40 is in contact with the restriction portion 52.

A broken line A1 shown in FIGS. 5A, 5B, and 5C is a straight line that connects the center of the rotating shaft 35 and the hook hooking portion 59, and is a position where the direction of a rotational force applied to the rotating member 30 by the tension coil spring 71 is switched. As described above, one end of the tension coil spring 71 is hooked to the hook hooking portion 38 and the other end of the tension coil spring 71 is hooked to the hook hooking portion 59.

FIG. 5A shows a state where a user pulls the cover 9. Accordingly, the cover 9 is moved in a direction in which the cover 9 is opened, and the portion 93 to be pulled is moved to the front side. As a result, the pulling portion 34 of the rotating member 30 is moved along the surface of the portion 93 to be pulled and the rotating member 30 is rotated in the release direction.

In FIG. 5A, the rotating member 30 receives not only a user's pulling force but also a force applied from the tension coil spring 71. The tension coil spring 71 applies a force to the hook hooking portion 38 of the rotating member 30 in a direction in which the tension coil spring 71 is contracted, that is, a direction from the hook hooking portion 38 toward the hook hooking portion 59. That is, the tension coil spring 71 applies a force in a direction in which the cover 9 is hindered from being opened.

The direction of moment of a force, which is applied to the rotating member 30 by the tension coil spring 71, about the rotating shaft 35 is determined depending on a positional relationship between the rotating shaft 35, the hook hooking portion 38, and the hook hooking portion 59 as described below. Hereinafter, the direction of moment of a force, which is applied to the rotating member 30 by the tension coil spring 71, about the rotating shaft 35 is referred to as the direction of a rotational force applied by the tension coil spring 71.

Since the positions of the rotating shafts 35 and the hook hooking portion 59 are determined by the holding member 50 in the present exemplary embodiment, a positional relationship between the rotating shafts 35 and the hook hooking portion 59 is not changed even though the rotating member 30 is rotated in the release direction. On the other hand, the relative positions of the rotating shafts 35 and the hook hooking portion 38 are changed as the rotating member 30 is rotated in the release direction.

In a case where the hook hooking portion 38 is positioned below the broken line A1 shown in FIG. 5A, the direction of a force applied to the rotating member 30 by the tension coil spring 71 is the locking direction. On the other hand, in a case where the hook hooking portion 38 is positioned above the broken line A1, the direction of a force of the tension coil spring 71 is the release direction.

More specifically, since the direction of a rotational force applied by the tension coil spring 71 is the locking direction in FIG. 5A, a state where the pulling portion 34 of the rotating member 30 and the portion 93 to be pulled of the pushing member 91 are in contact with each other is maintained.

FIG. 5B shows a state where the cover 9 is further opened from the state shown in FIG. 5A and an end of the elastic member 40 is in contact with the restriction portion 52 of the holding member 50.

In FIG. 5B, the hook hooking portion 38 is present below the broken line A1 and the direction of a rotational force applied by the tension coil spring 71 is the locking direction and is not the release direction. In other words, before a rotational force applied by the tension coil spring 71 acts in the release direction, the end of the elastic member 40 is in contact with the restriction portion 52 of the holding member 50. Before the rotating member 30 is further rotated by the tension coil spring 71, the rotating member 30 and the restriction portion 52 start to be in elastic contact with each other.

In a case where the cover 9 is further opened from the state shown in FIG. 5B, the rotating member 30 is further rotated in the release direction along the inclined surface of the portion 93 to be pulled and the hook hooking portion 38 is positioned above the broken line A1. In a case where the hook hooking portion 38 is positioned above the broken line A1, a rotational force in the release direction is applied to the rotating member 30 from the tension coil spring 71 and the pulling portion 34 and the portion 93 to be pulled are separated from each other.

FIG. 5C shows a state where the cover 9 is opened and the movement of the rotating member 30 is stopped.

The elastic member 40 is in contact with the restriction portion 52 until a state shown in FIG. 5B is changed to a state shown in FIG. 5C, and the elastic deformation of the elastic member 40 is increased as a state is changed to the state shown in FIG. 5C. Further, a position where the elastic member 40 is in contact with the restriction portion 52 is moved to the front side as the state shown in FIG. 5B is changed to the state shown in FIG. 5C. In other words, the elastic member 40 comes into contact with the restriction portion 52 from a side of the elastic member 40 close to the rotating shaft 35, and a side of the elastic member 40 far from the rotating shaft 35 of the rotating member 30 gradually comes into contact with the restriction portion 52.

In the present exemplary embodiment, the rotating member 30 and the restriction portion 52 start to be in elastic contact with each other before the rotating member 30 is further rotated by the tension coil spring 71 in a case where the cover 9 is opened, and the elastic member 40 is elastically deformed until the cover 9 is opened. Accordingly, in a case where the rotating member 30 is accelerated by the rotation applying member 70, an excessive increase in a rotational speed is suppressed. For this reason, collision noise generated in a case where the rotating member 30 and the restriction portion 52 of the holding member 50 collide with each other is suppressed.

Next, movement in a case where the cover 9 is closed will be described with reference to FIGS. 5C and 6.

Figure 6:
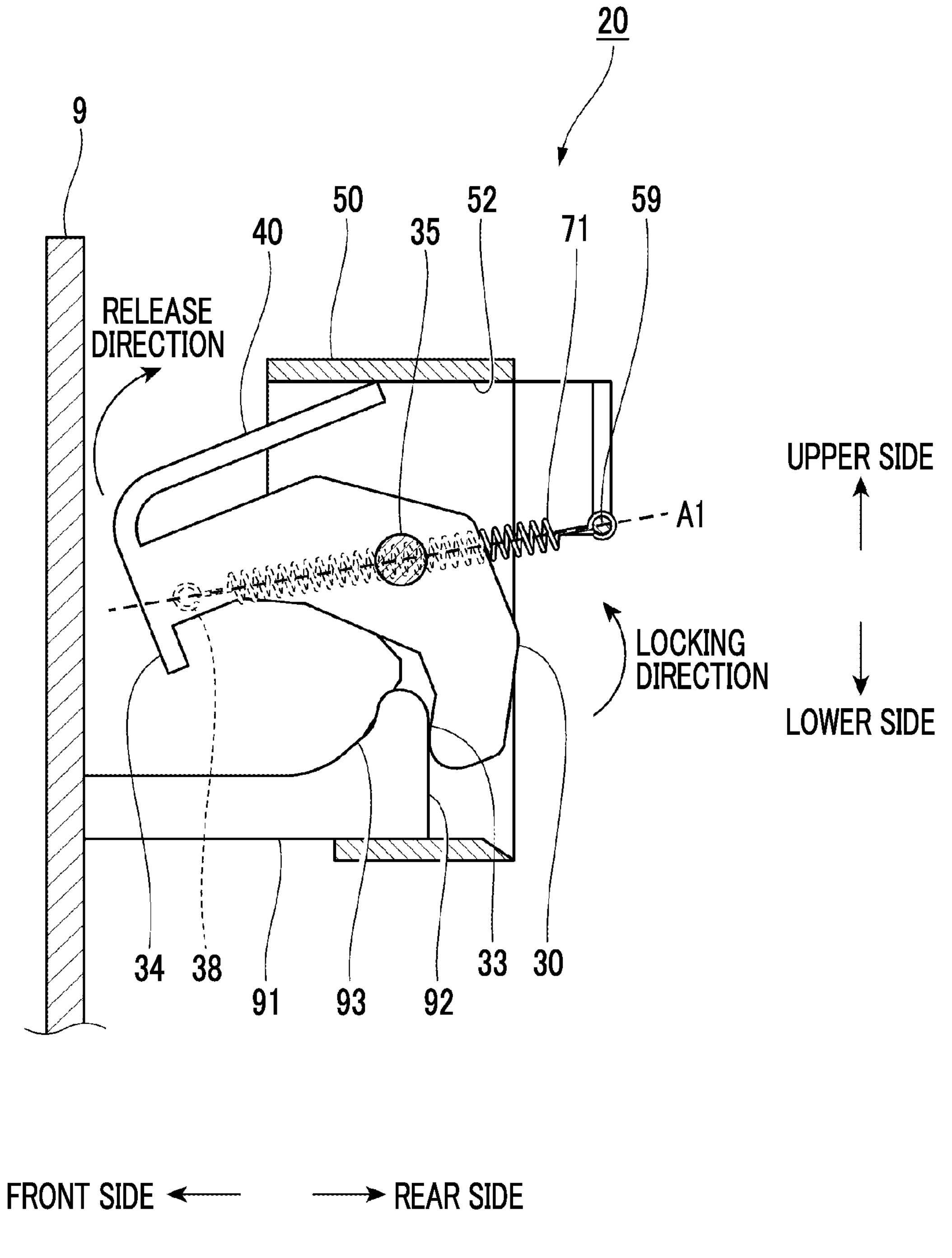
FIG. 6 is a diagram illustrating a relationship between the locking unit and the pushing member in a case where the cover is closed.

FIG. 6 is a diagram illustrating a relationship between the locking unit 20 and the pushing member 91 in a case where the cover 9 is closed. FIG. 6 shows a state where the pushing member 91 pushes the rotating member 30 up to a position where the direction of a rotational force applied to the rotating member 30 by the tension coil spring 71 is switched.

In a case where the cover 9 is closed from the state shown in FIG. 5C, the pushing member 91 provided on the cover 9 is moved to the rear side. Then, a pushing portion 92 of the pushing member 91 pushes the receiving portion 33 of the rotating member 30 and rotates the rotating member 30 in the locking direction (see FIG. 6). A force is applied to the rotating member 30 from the tension coil spring 71 in the release direction. In addition, since the elastic member 40 is elastically deformed, the rotating member 30 receives a force from the elastic member 40 in a direction in which the rotating member 30 is rotated in the locking direction. For this reason, a force for pushing the pushing portion 92 to the rear side is reduced as compared to a case where the elastic member 40 is not provided.

In a case where the cover 9 is further closed from a state shown in FIG. 6, the direction of a rotational force applied to the rotating member 30 by the tension coil spring 71 is switched from the release direction to the locking direction. Accordingly, the receiving portion 33 of the rotating member 30 and the pushing portion 92 are separated from each other, and the pulling portion 34 and the portion 93 to be pulled of the pushing member 91 are in contact with each other.

In the present exemplary embodiment, the elastic member 40 applies a rotational force to the rotating member 30 in the locking direction in a case where the cover 9 is closed. Accordingly, a force required to close the cover 9 is reduced as compared to a case where the elastic member 40 is not provided.

Next, Modification Example 1 of the present exemplary embodiment will be described with reference to FIG. 7.

Figure 7:
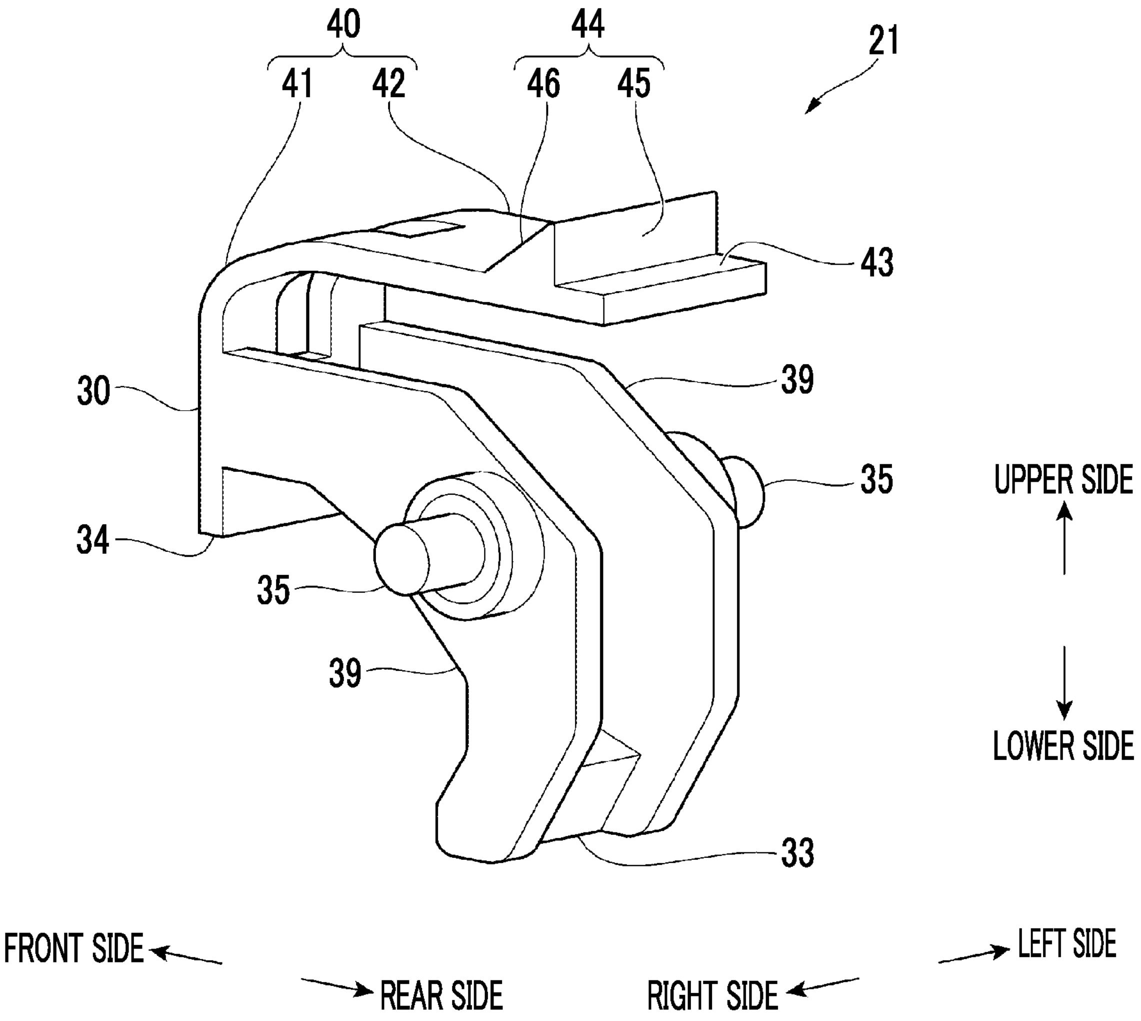
FIG. 7 is a diagram showing a modification example in which a protrusion portion is provided on an end side of a plate portion.

FIG. 7 is a diagram showing a modification example in which a protrusion portion 44 is provided on an end side of the plate portion 42.

Reference numerals identical to the reference numerals of the above-mentioned exemplary embodiment are used for functions identical to the functions of the above-mentioned exemplary embodiment, and the description of the functions will be omitted here.

In a pulling member 21 shown in FIG. 7, the protrusion portion 44 is added to the pulling member 21 to which the above-mentioned present exemplary embodiment is applied.

Since the protrusion portion 44 is provided on the end side of the plate portion 42 and is caught on a step 53 (described later) provided on the restriction portion 52, a force required to open the cover 9 is increased. The step 53 is an example of an operational force-increasing portion.

The protrusion portion 44 according to the present modification example includes a protruding surface 45 that is provided on the end side of the plate portion 42 and extends from a surface of the plate portion 42 to be substantially perpendicular to the surface of the plate portion 42, and a gently inclined surface 46 that is provided to be connected from the protruding surface 45 and is connected to the plate portion 42 at an angle smaller than an angle at which the protruding surface 45 protrudes.

Action

The action of Modification Example 1 will be described with reference to FIGS. 8A, 8B, and 8C.

Figures 8A, 8B, 8C:
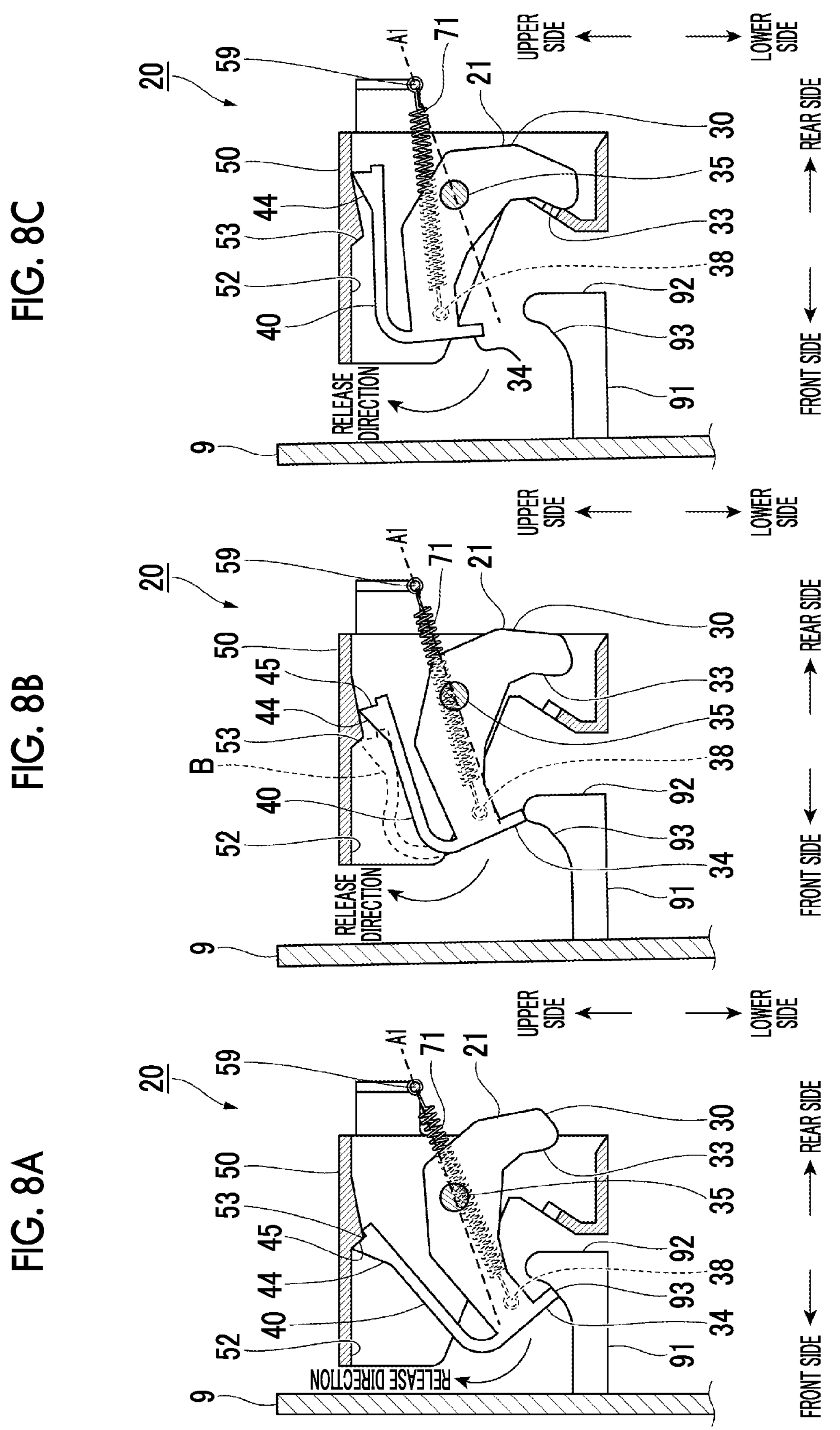
FIGS. 8A, 8B, and 8C are diagrams illustrating a relationship between the pulling member and the pushing member in a case where a locked state is released, and are shown in chronological order.

FIGS. 8A, 8B, and 8C are diagrams illustrating a relationship between the pulling member 21 and the pushing member 91 in a case where the locked state is released, and are shown in chronological order. FIG. 8A is a diagram showing a state where the protrusion portion 44 is caught on the step 53 of the restriction portion 52, FIG. 8B is a diagram showing an aspect where the protrusion portion 44 gets over the step 53, and FIG. 8C shows a state where the locked state is released.

As shown in FIG. 8A, the protruding surface 45 of the elastic member 40 butts against the step 53 of the restriction portion 52 in a case where the pulling member 21 is rotated. Accordingly, a force for rotating the pulling member 21 in the release direction is further increased. In other words, an operational force for rotating the pulling member 21 in the release direction is further increased.

The state of the elastic member 40 during the change of a state shown in FIG. 8A to a state shown in FIG. 8B will be described. In a case where the cover 9 is further opened from the state shown in FIG. 8A, the rotating member 30 is rotated clockwise. However, since the protruding surface 45 butts against the step 53, the elastic member 40 is bent as shown by a broken line B shown in FIG. 8B until the protrusion portion 44 gets over the step 53. After the protrusion portion 44 gets over the step 53, the rotating member 30 is further rotated by the portion 93 to be pulled.

As shown in FIG. 8A, in a case where the protruding surface 45 and the step 53 butt against each other, the hook hooking portion 38 is positioned below the broken line A1 that connects the hook hooking portion 59 and the rotating shaft 35 of the rotating member 30. For this reason, the tension coil spring 71 applies to a rotational force to the rotating member 30 in the release direction. In other words, the rotating member 30 and the step 53 of the restriction portion 52 start to be in elastic contact with each other before the rotating member 30 is further rotated in the release direction by the tension coil spring 71.

Since the hook hooking portion 38 is positioned above the broken line A1 in the state shown in FIG. 8B, the direction of a rotational force applied to the rotating member 30 by the tension coil spring 71 is the release direction. The rotating member 30 is rotated in the release direction and is in the state shown in FIG. 8C.

Figure 9:
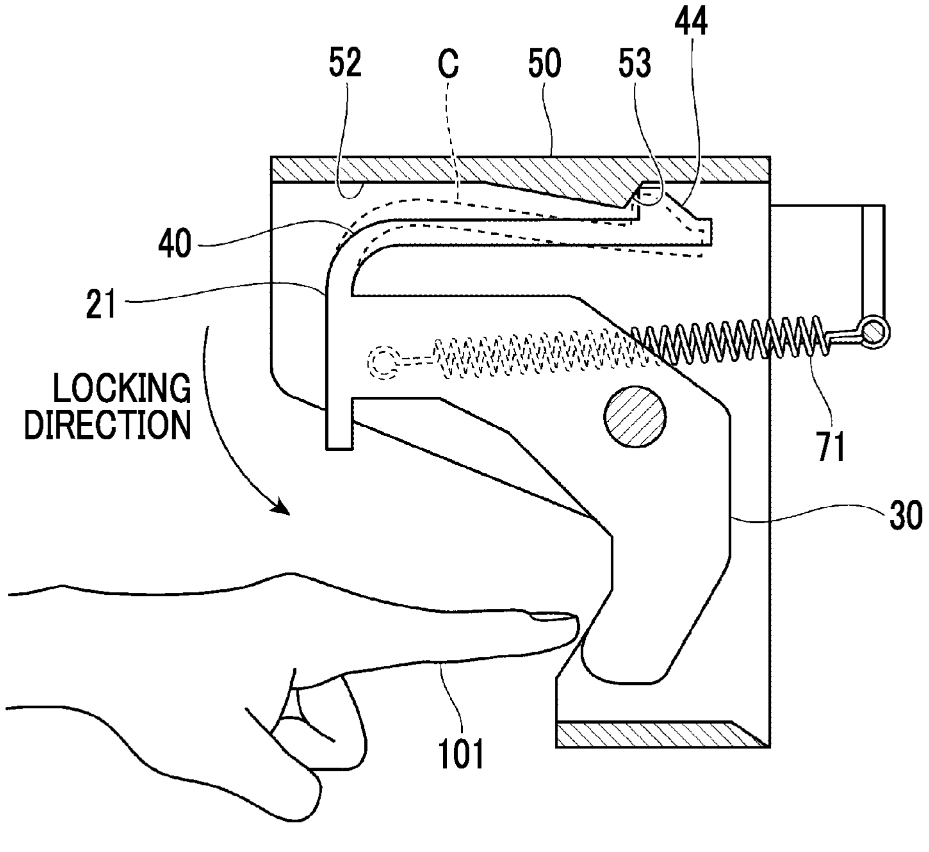
FIG. 9 is a diagram showing a modification example in which the disposition of a step shown in FIGS. 8A, 8B, and 8C and the disposition of the protrusion portion are changed.

FIG. 9 is a diagram showing Modification Example 2 in which the disposition of the step 53 shown in FIGS. 8A, 8B, and 8C and the disposition of the protrusion portion 44 are changed.

A pulling member 21 shown in FIG. 9 is different from the pulling member 21 of Modification Example 1 shown in FIGS. 7, 8A, 8B, and 8C in terms of the orientation of the protrusion portion 44 and the orientation of the step 53.

In Modification Example 2, a force for bending the elastic member 40 as shown by a broken line C is required to cause the protrusion portion 44 to get over the step 53. Accordingly, a force required to rotate the rotating member 30 in the locking direction is increased as compared to a case where the step 53 is not provided. According to Modification Example 2, for example, in a case where a user's finger 101 comes into contact with the rotating member 30 while a user opens the cover 9 (see FIG. 1) and performs work inside the housing 2 (see FIG. 1), the rotation of the rotating member 30 in the locking direction is suppressed.

Supplementary Note (((1)))

A locking mechanism comprising:

a first member that is provided on one side to lock and is rotated about a rotating shaft;

a second member that is provided on the other side to lock and comes into contact with the first member to rotate the first member;

a rotation applying member that further applies a rotational force to the first member rotated by the second member;

a restriction portion that restricts movement of the first member to be rotated in a direction in which the first member is released from a locked state; and an elastic portion that allows the first member and the restriction portion to be in elastic contact with each other and allows the first member and the restriction portion to start to be in elastic contact with each other before the first member rotated by the second member is further rotated by the rotation applying member in a release direction which is the direction in which the first member is released from the locked state.

(((2)))

The locking mechanism according to (((1))), wherein deformation of the elastic portion is increased as the first member is rotated in the release direction.

(((3)))

The locking mechanism according to (((2))), wherein the elastic portion is provided on the first member, and in a case where the elastic portion comes into contact with the restriction portion, a side of the elastic portion close to the rotating shaft of the first member comes into contact with the restriction portion and then a side of the elastic portion far from the rotating shaft of the first member gradually comes into contact with the restriction portion.

(((4)))

The locking mechanism according to (((3))), wherein the elastic portion is a plate-like member that rises from an end portion of the first member and extends along the first member.

(((5)))

The locking mechanism according to (((4))), wherein in a case where the elastic portion is in contact with the restriction portion, the elastic portion applies a rotational force to the first member in a locking direction that is a direction opposite to the release direction.

(((6)))

The locking mechanism according to (((5))), further comprising:

an operational force-increasing portion that increases an operational force required to rotate the first member in the release direction.

(((7)))

The locking mechanism according to (((6))), wherein the elastic portion is provided on the first member, and the operational force-increasing portion is a step that is provided on the restriction portion and has a stepped shape in which a side on which the elastic portion is moved along the restriction portion in a case where the first member is rotated in the release direction is close to the rotating shaft of the first member.

(((8)))

The locking mechanism according to (((7))), wherein the elastic portion further includes a protrusion portion that is to be caught on the step and has a protruding shape.

(((9)))

The locking mechanism according to (((8))), wherein when the first member and the restriction portion are allowed to start to be in elastic contact with each other, the protrusion portion and the step come into contact with each other.

(((10)))

An image forming apparatus including the locking mechanism according to any one of (((1))) to (((9))), the image forming apparatus comprising:

an apparatus body that forms an image; and a cover that is openable and closable on the apparatus body, wherein the apparatus body side is provided with the first member, the rotation applying member, the restriction portion, and the elastic portion, and the cover side is provided with the second member.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A locking mechanism for an image forming apparatus comprising an apparatus body and a cover, the locking mechanism comprising:

a first member that is provided on the apparatus body and is rotated with a rotating shaft relatively to the apparatus body;

a second member that is provided on the cover and is configured to be moved with the cover to come into contact with the first member to rotate the first member;

a rotation applying member that is provided on the apparatus body and further applies a rotational force to the first member rotated by the second member;

a restriction portion that is provided on the apparatus body and is configured to be in elastic contact with the first member to restrict movement of the first member to be rotated in a direction in which the first member is released from a locked state; and an elastic portion that is provided on the apparatus body and allows the first member and the restriction portion to be in elastic contact with each other and allows the first member and the restriction portion to start to be in elastic contact with each other before the first member rotated by the second member is further rotated by the rotation applying member in a release direction which is the direction in which the first member is released from the locked state.

2. The locking mechanism according to claim 1, wherein deformation of the elastic portion is increased as the first member is rotated in the release direction.

3. The locking mechanism according to claim 2, wherein the elastic portion is provided on the first member, and in a case where the elastic portion comes into contact with the restriction portion, a side of the elastic portion close to the rotating shaft of the first member comes into contact with the restriction portion and then a side of the elastic portion far from the rotating shaft of the first member gradually comes into contact with the restriction portion.

4. The locking mechanism according to claim 3, wherein the elastic portion is a plate-like member that rises from an end portion of the first member and extends along the first member.

5. The locking mechanism according to claim 4, wherein in a case where the elastic portion is in contact with the restriction portion, the elastic portion applies a rotational force to the first member in a locking direction that is a direction opposite to the release direction.

6. The locking mechanism according to claim 1, further comprising:

an operational force-increasing portion that increases an operational force required to rotate the first member in the release direction.

7. The locking mechanism according to claim 6, wherein the elastic portion is provided on the first member, and the operational force-increasing portion is a step that is provided on the restriction portion and has a stepped shape in which a side on which the elastic portion is moved along the restriction portion in a case where the first member is rotated in the release direction is close to the rotating shaft of the first member.

8. The locking mechanism according to claim 7, wherein the elastic portion further includes a protrusion portion that is to be caught on the step and has a protruding shape.

9. The locking mechanism according to claim 8, wherein when the first member and the restriction portion are allowed to start to be in elastic contact with each other, the protrusion portion and the step come into contact with each other.

10. An image forming apparatus including the locking mechanism according to claim 1, the image forming apparatus comprising:

the apparatus body that forms an image; and the cover that is openable and closable on the apparatus body.

11. An image forming apparatus including the locking mechanism according to claim 2, the image forming apparatus comprising:

the apparatus body that forms an image; and the cover that is openable and closable on the apparatus body.

12. An image forming apparatus including the locking mechanism according to claim 3, the image forming apparatus comprising:

the apparatus body that forms an image; and the cover that is openable and closable on the apparatus body.

13. An image forming apparatus including the locking mechanism according to claim 4, the image forming apparatus comprising:

the apparatus body that forms an image; and the cover that is openable and closable on the apparatus body.

14. An image forming apparatus including the locking mechanism according to claim 5, the image forming apparatus comprising:

the apparatus body that forms an image; and the cover that is openable and closable on the apparatus body.

15. An image forming apparatus including the locking mechanism according to claim 6, the image forming apparatus comprising:

the apparatus body that forms an image; and the cover that is openable and closable on the apparatus body.

16. An image forming apparatus including the locking mechanism according to claim 7, the image forming apparatus comprising:

the apparatus body that forms an image; and the cover that is openable and closable on the apparatus body.

17. An image forming apparatus including the locking mechanism according to claim 8, the image forming apparatus comprising:

the apparatus body that forms an image; and the cover that is openable and closable on the apparatus body.

18. An image forming apparatus including the locking mechanism according to claim 9, the image forming apparatus comprising:

the apparatus body that forms an image; and the cover that is openable and closable on the apparatus body.

* * * * *